March 9, 1926.  J. B. PAWLEY  1,576,246
AUTOMATIC FILM WINDING CAMERA
Filed Nov. 25, 1924
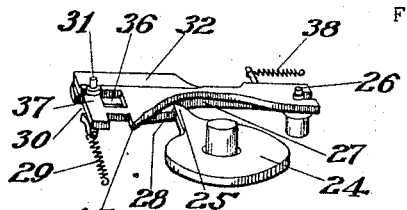
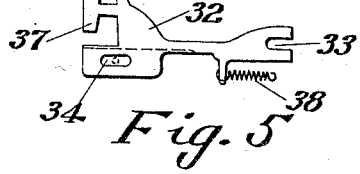
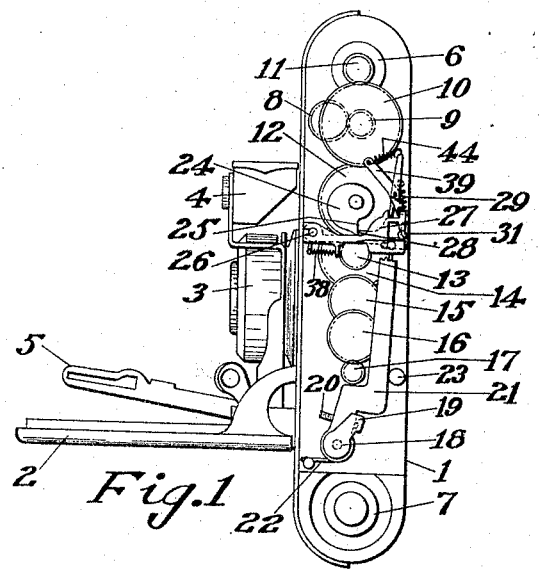
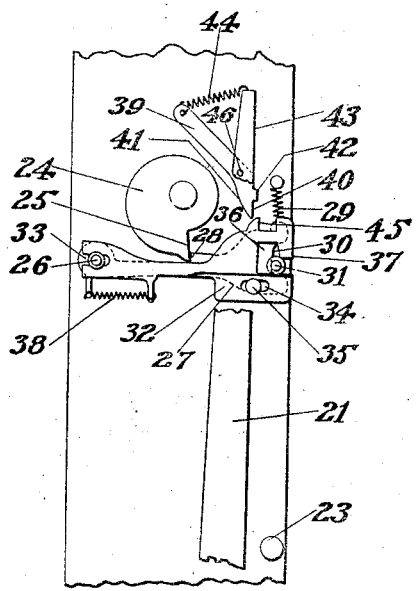
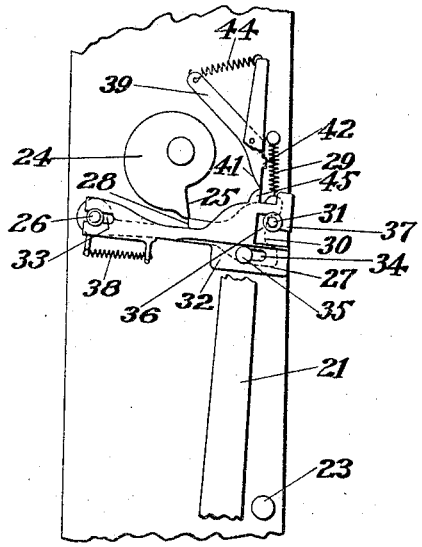
INVENTOR
JOHN B PAWLEY
BY
ATTORNEY Patented Mar. 9, 1926.

1,576,246

UNITED STATES PATENT OFFICE.

JOHN B. PAWLEY, OF BINGHAMTON, NEW YORK, ASSIGNOR TO ANSCO PHOTO-PRODUCTS, INC., OF BINGHAMTON, NEW YORK.

AUTOMATIC FILM-WINDING CAMERA.

Application filed November 25, 1924. Serial No. 752,209.

*To all whom it may concern:*

Be it known that I, JOHN B. PAWLEY, a citizen of the United States, and a resident of the city of Binghamton, county of Broome, and State of New York, have invented certain new and useful Improvements in an Automatic Film-Winding Camera, of which the following is a description, reference being had to the accompanying drawings, which form a part of this specification.

This invention relates generally to cameras and is particularly directed to that type of camera adapted to use roll film.

More specifically my invention is directed to a roll film camera having power means for automatically winding up the exposed portion of the film and bringing a new unexposed portion into position for exposure; such winding mechanism being controlled by the operation of the shutter and adapted to be actuated immediately after the same has been operated to make an exposure.

It is an object of my invention to provide a simple, practical and efficient stopping and releasing mechanism for the power driven winding means, such stopping and releasing device being connected on the one hand with the gear train forming a part of the winding device, and on the other hand with the shutter operating mechanism.

A second and important object is to provide a safety device which cooperates with the stopping and releasing mechanism in a manner to prevent accidental operation or displacement of the same.

A third object is to construct and arrange the various parts of the winding and controlling mechanism of the camera that the highest degree of efficiency and accuracy is obtained therefrom with the least amount of labor and material possible.

A further object is to construct the parts of this camera in a manner to render the same entirely automatic in their operation, thereby rendering the camera foolproof and of the easiest manipulation.

Heretofore in cameras of the automatic type there has always been the danger of accidentally releasing the mechanism to wind the film and thus causing a waste which is both annoying and expensive. It has been found that because of the delicately adjusted parts of cameras of this character, dropping the same or accidentally laying the camera down with a jar would result in releasing the winding mechanism with the aforementioned results. It has been my object, therefore, to eliminate this objection and to provide the winding mechanism with a safety device which is automatic in its operation and, cooperating with the stopping and releasing mechanism of the camera, effectively prevents the operation of said releasing and stopping mechanism at all times except when the mechanism is actuated by the shutter controlling means.

It is also well known that heretofore, in cameras of the character described, the stopping and releasing devices have not been entirely satisfactory in that no positive means has been devised which would at all times properly release and stop the winding mechanism when it should. By my invention I have overcome this difficulty with an exceedingly simple arrangement of levers which are always certain in their operation and dependable at all times to perform the function required of them.

Other objects and advantages in details of construction and operation will be apparent as the description proceeds, reference being had to the accompanying drawings wherein like reference numerals indicate like parts.

In the drawings:

Figure 1 is a side view of my improved camera, the cover or cap being removed therefrom to show the assembled parts.

Figure 2 is a detailed plan view of my new safety catch and releasing mechanism in one position of operation, parts being broken away for clearness in illustration.

Figure 3 is similar to Figure 2 and showing the parts in another operative position.

Figure 4 is a perspective detail of the stopping and releasing mechanism.

Figure 5 is a detail of my improved safety device.

An automatic film winding camera of the usual folding type is indicated generally by the reference numeral 1 and is provided with the usual platform 2, shutter 3, viewfinder 4, and operating lever 5.

A train of gears shown diagrammatically in Figure 1 is mounted upon one side of the camera for the purpose of driving the takeup spool 6, and thus winding a length of film from the supply spool 7, whereby a new length of unexposed film is properly positioned for use. This gear train comprises the pinion 8 which is directly driven by a spring motor or other power device. (Not shown.) Pinion 8 drives the pinion 9 carried by gear 10, which in turn drives the pinion 11, having a driving connection with the take-up spool 6. Gear 10 also meshes with and rotates gear 12 which, through a train indicated generally by 13, 14, 15, and 16, drives the centrifugal governor 17 which controls the speed of the winding mechanism.

The operating lever 5 is rigidly mounted upon one end of the shaft 18 extending crosswise through the body of the camera. The opposite end of this shaft carries an arm 19 so arranged that upon downward movement of the lever 5, side arm 19 will engage the adjusting screw 20 carried by the controlling lever 21 of the spring 22. Upon the return or upward movement of lever 5, operating lever 21 will be thrown back to the right in Figure 1 against the stop pin 23 by the tension exerted by spring 22, thus releasing the winding mechanism in a manner to be described.

It should be noted that operating lever 5 is preferably suitably connected to the shutter operating mechanism when the shutter is pulled out or extended on this platform 2. By means of this connection it will be understood that the winding mechanism will be released for operation only after an exposure has been made by the shutter.

The parts thus far described and referred to are all shown and described in Patent No. 1,197,901, dated Sept. 12, 1916, and Patent No. 1,268,805, dated June 4, 1918. The above parts, therefore, are of usual construction and form no part of this invention. For a detailed description and disclosure of the same, reference should be had to the patents mentioned.

Referring now more particularly to the stopping and releasing device for the film-winding mechanism, it will be noted that the gear 12 carries rigidly therewith a dog 24 provided with a shoulder 25. Pivoted at 26 is the stop lever 27 shown for the most part in dotted lines. This lever is placed slightly above the gear train and is provided with a shoulder 28, directly in the path of and cooperating with shoulder 25 of the dog 24. A coil spring 29 acts to normally pull the stop lever 27 upwardly on its pivot, whereby the shoulder 28 will engage the shoulder 25 thus forming a stop for the winding mechanism. The free end of the lever 27 is bifurcated as at 30 (see Figures 1 and 2) and a guide pin 31 engaging said bifurcated end, limits the movement of said lever.

It will be seen from the description thus far that should the lever 27 be rocked downwardly, the dog 24 will be disengaged thus permitting the gear train, which is always under tension from the motor driven pinion 8, to rotate thus causing the film to wind. The ratio of the gear train to pinion 11 which drives the film spool is such that one revolution of gear 12 carrying the dog 24 permits the winding of one complete exposure length of film.

Lying directly adjacent to the stop lever 27 is a second lever 32, also pivoted at 26 by means of its notched end 33. This lever 32 is slidably secured to the lever 27 by means of a slot 34 in which engages the pin 35 carried by said lever 27. The end of the lever 32, opposite the pivot, is also bifurcated as at 36. The upper projecting portion of said bifurcation being provided with a downwardly extending nose 37. A coil spring 38 normally pulls the lever 32 to the left in Figures 2 and 3, thus preventing the bifurcations in the opposite ends of the levers from registering and bringing the nose 37 on the lever 32 into engagement with the upper side of the guide pin 31, thus normally preventing the downward movement of said levers to release the dog 24. It will be noted, however, that upon sliding the lever 32 to the right in Figures 2 and 3, the nose 37 is disengaged from pin 31 and the bifurcations 36 and 30 are permitted to register, thereby making it possible to rock the levers downwardly against the tension of spring 29 thus release the stopping device.

The mechanism for causing these sliding and rocking movements comprises a pawl 39 pivotally carried near the upper end of the operating lever 21. This pawl is provided at its lower end with a shoulder 40, the opposite side of which is beveled as at 41. An ear 42 is turned at right angles on the pawl 39 and engages with the edge 43 of the lever 21. A coil spring 44 normally holds said pawl 39 in such engagement with the edge of the lever 21. Formed on the upper side of the lever 32 is a lug 45 lying in the path of and cooperating with the lower end of the pawl 39.

The operation of my improved releasing and stopping mechanism will now be described. The parts are shown in their normal position in Figure 1. In such position it will be noted that the operating lever 21 is at the extreme right and in such position the lower beveled end 41 of pawl 39 is positioned to the right of the lug 45. Upon the operation of the camera to make an exposure in the manner heretofore mentioned and clearly described in the patents above referred to, the lever 21 is first rocked to the left in Figure 1 against the tension spring 22. Such movement carries the beveled side of the nose 41 past the lug 45, the spring 44 yielding to permit the pawl 39 to rock on its pivot 46, thus allowing the said nose to idly ride over said lug. After the exposure has been made and the shutter released in the usual manner, the spring 22 throws the lever 21 back to the right. Upon this movement to the right, the straight shoulder 40 of the pawl 39 engages the beveled side of the lug 45 and as said pawl 39 is now rigid with the lever 21, due to the ear 42, the engagement between the nose 40 and lug 45 causes the lever 32 to slide to the right until the bifurcations 36 and 30 register in which position the nose 37 is out of engagement with the guide pin 31. When the parts reach this position, it will be seen that the levers 32 and 27 will be forced downwardly against the action of spring 29 by the continued engagement of nose 41 which the lug 45. Figure 2 shows the parts in the position occupied as the sliding movement of the lever 32 takes place. Figure 3 shows the parts in the position occupied upon the completion of such sliding movement with the levers rocked downwardly, disengaging the dog 24 and thus permitting the operation of the winding mechanism.

As soon as the nose 41 has passed the lug 45, resuming its normal position shown in Figure 1, and the stop shoulder 25 has been released from and passed the shoulder 28 and started on its movement with the gear 12, the springs 29 and 38 immediately act to return the levers to their normal position, spring 29 pulling the levers upwardly so that shoulder 28 is again in position to engage and stop the shoulder 25 and spring 38 sliding the lever 32 back where the nose 37 again engages the guide pin 31.

From the foregoing description it will be seen that in addition to providing an automatic stopping and releasing device for the winding mechanism, I have combined therewith a safety device in the form of the lever 32 which positively prevents the set-off of the releasing mechanism before the proper time, namely after the shutter has been snapped and the exposure made. The nose 37 normally engaging the pin 31 effectively locks the releasing lever against downward movement until the operating lever 21 makes its return movement to the right, which movement only occurs after the shutter has been operated as explained in the aforementioned patents.

Furthermore, this safety device prevents the accidental operation of the releasing device because of dropping the camera or a sudden jar which otherwise might cause the lever 27 to rock on its pivot against the action of spring 29 and releasing the dog 24. In other words, with the nose 37 normally engaging the pin 31, it is not possible to shake or jar the releasing mechanism into operation.

My invention then discloses a new and improved camera whereby double exposures are prevented due to the fact that the film is automatically wound up after each exposure; greater speed in the making of exposures is permitted due to the fact that it is unnecessary to wind the film by hand; the positive stop and release mechanism which eliminates the possibility of improper function of the winding mechanism; and a safety device has been included which double insures the accurate operation of the mechanism.

The form of my invention herein shown and described is but one embodiment thereof and it is to be understood that many changes and variations in details of construction and operation are possible. I do not limit myself, therefore, to the specific structure shown, other than by the appended claims.

I claim:

1. A releasing device for a camera winding mechanism comprising a driven element, a pivoted stop lever therefor, the free end of said stop lever being bifurcated, a guide pin for said bifurcated end, operating means for said lever, a safety arm carried by said lever and having a bifurcated end normally out of register with the bifurcation on said stop lever whereby said lever is held from movement, and means on said operating means for causing said bifurcation to register permitting movement of said stop means to release the winding mechanism.

2. A releasing device for a camera winding mechanism comprising a driven element, a pivoted stop lever therefor having its free end bifurcated and engaging a guide pin, operating means for said lever, a slidable safety arm having a pin and slot connection with said lever and provided with a bifurcated end and an overhanging nose, said nose normally engaging said guide pin to prevent movement of said stop lever, and means on said operating means for imparting sliding movement to said safety arm whereby said nose will disengage from said guide pin, the bifurcations will register and permit movement of said stop lever to release the winding mechanism.

3. A releasing device for a camera winding mechanism comprising a driven element, a stop lever therefor, a safety arm carried thereby, bifurcations in the free ends of said lever and arm normally out of register and operating means for causing said bifurcated ends to register and permit movement of said stop lever to release winding mechanism.

JOHN B. PAWLEY.